(12) United States Patent
 Okuhara (10) Patent No.: US 9,054,505 B2
(45) Date of Patent: Jun. 9, 2015

(54) WIRE HARNESS EXTERIOR BODY

(75) Inventor: Takashi Okuhara, Yokkaichi (JP)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 0 days.

(21) Appl. No.: 14/235,622

(22) PCT Filed: Feb. 15, 2012

(86) PCT No.: PCT/JP2012/053488
 § 371 (c)(1),
 (2), (4) Date: Jan. 28, 2014

(87) PCT Pub. No.: WO2013/035352
 PCT Pub. Date: Mar. 14, 2013

(65) Prior Publication Data
 US 2014/0224945 A1 Aug. 14, 2014

(30) Foreign Application Priority Data
 Sep. 5, 2011 (JP) ................... 2011-192955

(51) Int. Cl.
 *H02G 3/30* (2006.01)
 *B60R 16/02* (2006.01)
 *H01B 7/00* (2006.01)
 *H02G 3/04* (2006.01)
 *H02G 3/00* (2006.01)

(52) U.S. Cl.
 CPC .............. *H02G 3/0468* (2013.01); *H02G 3/30* (2013.01); *H02G 3/263* (2013.01); *B60R 16/0215* (2013.01)

(58) Field of Classification Search
 CPC ......... H02G 3/30; H02G 3/32; H01B 7/0045; F16L 3/12; F16L 3/1207; F16L 3/1226; F16L 3/123; F16L 3/137; F16L 3/233; B60R 16/0207
 USPC ........ 248/74.1, 65, 71, 72, 73, 74.3; 174/72 A
 See application file for complete search history.

(56) References Cited

U.S. PATENT DOCUMENTS 3,154,281 A * 10/1964 Frank .......................... 248/201
3,454,247 A * 7/1969 Geisinger .................... 248/56
(Continued)

FOREIGN PATENT DOCUMENTS

JP U-04-086022 7/1992
JP A-07-135724 5/1995
(Continued)

OTHER PUBLICATIONS

International Search Report issued in Application No. PCT/JP2012/053488; Dated Apr. 24, 2012.

*Primary Examiner* — Anita M King
(74) *Attorney, Agent, or Firm* — Oliff PLC (57) ABSTRACT

A half-pipe main body is formed so as to extend in the axial direction, has an area for installing a wire harness therein, and has a semi-circular structure in terms of the cross-sectional shape of the outer circumferential surface perpendicular to the axial direction. An anti-rotation section having a planar bottom surface is provided at the bottom of the outer circumference of the half-pipe main body. A pair of ribs is formed on the outer circumference of the half-pipe main body along the circumferential direction. Also, the ribs are formed, with a distance therebetween in the axial direction, on respective two side surfaces of the half-pipe main body that are separated by the anti-rotation section.

8 Claims, 9 Drawing Sheets

(56) References Cited

U.S. PATENT DOCUMENTS

| | | | |
|---|---|---|---|
| 3,632,069 A * | 1/1972 | Thayer et al. | 248/56 |
| 3,632,071 A * | 1/1972 | Cameron et al. | 248/74.3 |
| 4,391,376 A * | 7/1983 | Finnegan | 211/70.5 |
| 5,024,405 A * | 6/1991 | McGuire | 248/73 |
| 6,320,134 B1 * | 11/2001 | Rehberg et al. | 174/135 |
| 6,394,399 B2 * | 5/2002 | Koziol | 248/74.3 |
| 6,417,451 B1 * | 7/2002 | Uchiyama | 174/72 A |
| 6,827,316 B1 * | 12/2004 | Arai | 248/68.1 |
| 6,843,456 B1 * | 1/2005 | Hajianpour | 248/230.1 |
| 7,435,904 B2 * | 10/2008 | Peterson et al. | 174/72 A |
| 7,861,981 B2 * | 1/2011 | Olver | 248/68.1 |
| 2005/0257347 A1 * | 11/2005 | Tsuchiya | 24/1 |
| 2012/0132465 A1 * | 5/2012 | Mabuchi | 174/72 A |
| 2013/0075155 A1 * | 3/2013 | Kawai et al. | 174/70 C |

FOREIGN PATENT DOCUMENTS

| | | |
|---|---|---|
| JP | A-2000-184551 | 6/2000 |
| JP | A-2002-064917 | 2/2002 |
| JP | A-2003-224377 | 8/2003 |
| JP | A-2006-296166 | 10/2006 |

* cited by examiner

WIRE HARNESS EXTERIOR BODY

This application is the national phase of PCT International Application No. PCT/JP2012/053488 that has an International filing date of Feb. 15, 2012 and designated the United States of America and claims priority to Japanese Patent App. No. JP 2011-192955 that was filed on Sep. 5, 2011. The disclosure of the prior applications is hereby incorporated by reference herein in their entirety.

BACKGROUND

As disclosed in patent references Japanese Published Utility Model Application 4-86022, Japanese Published Patent Application 2000-184551, Japanese Published Patent Application 2002-64917, and Japanese Published Patent Application 2006-296166, technologies are known in which a wire harness arranged in a vehicle or the like is covered with a suitably bent corrugated tube.

Figure 12:
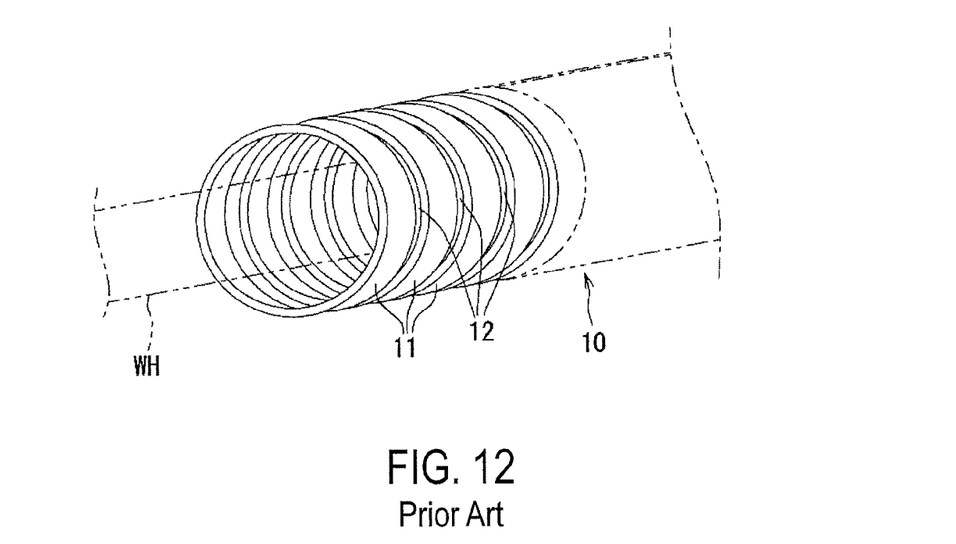
FIG. 12 is an explanatory view showing a structure of a corrugated tube.

FIG. 12 is an explanatory view showing a structure of a corrugated tube that is a wire harness exterior body.

In a corrugated tube 10, a wire harness WH is arranged inside of a corrugated tube main body portion that is constituted by annular convex portions 11 and annular concave portions 12.

A wire harness WH is constituted such that a plurality of wires is bundled. More specifically, the wire harness WH is constituted such that a plurality of wires is branched off and bundled according to the wiring configuration for a subject vehicle. The wire harness WH does not necessarily need to be branched off, and may be constituted by a single wire. Furthermore, another optical cable or the like may be bundled to the wire harness WH.

The corrugated tube 10 is a tubular member in which the annular convex portions 11 and the annular concave portions 12 are alternately formed along a longitudinal direction, and is formed of resin or the like. The corrugated tube 10 is easily elastically deformed at step portions or the like between annular convex portions 11 and annular concave portions 12. Thus, the entire corrugated tube 10 has an easily deformable property. Normally, as the corrugated tube 10, a tube is used that has an inner diameter larger than (usually slightly larger than) an outer diameter of the wire harness WH to be mounted.

Figure 13:
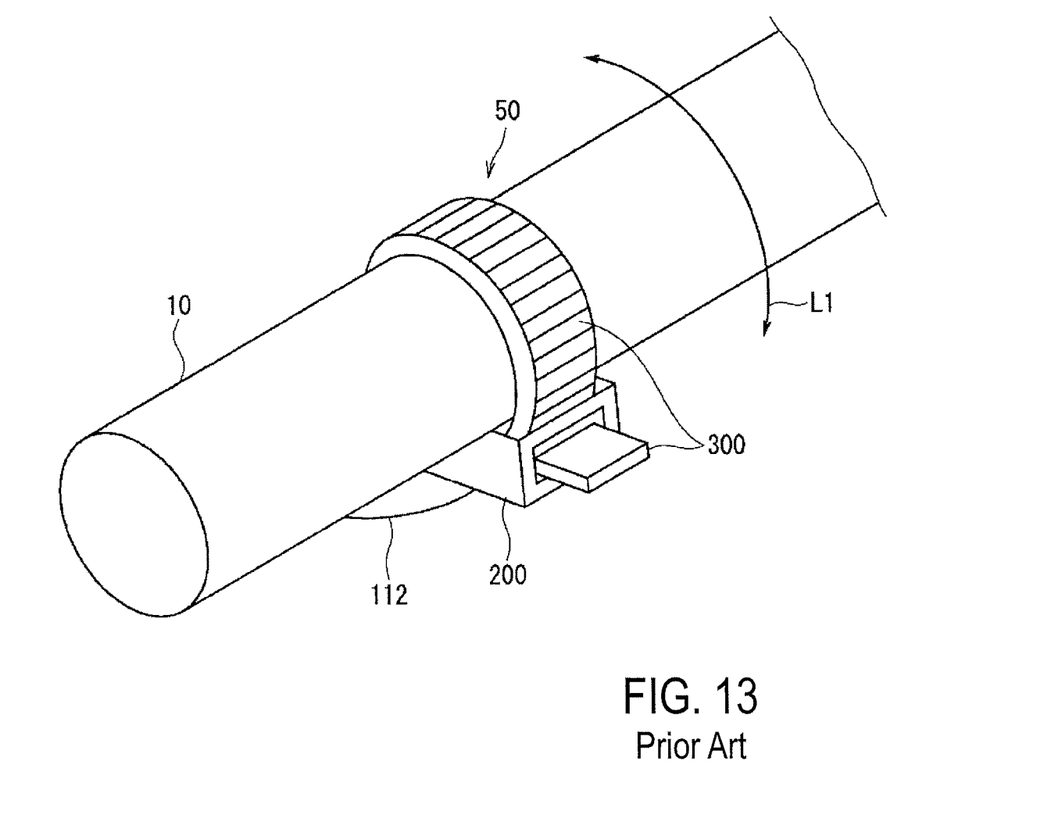
FIG. 13 is an explanatory view schematically showing a structure in which a belt clamp is mounted to a corrugated tube.
Figure 14:
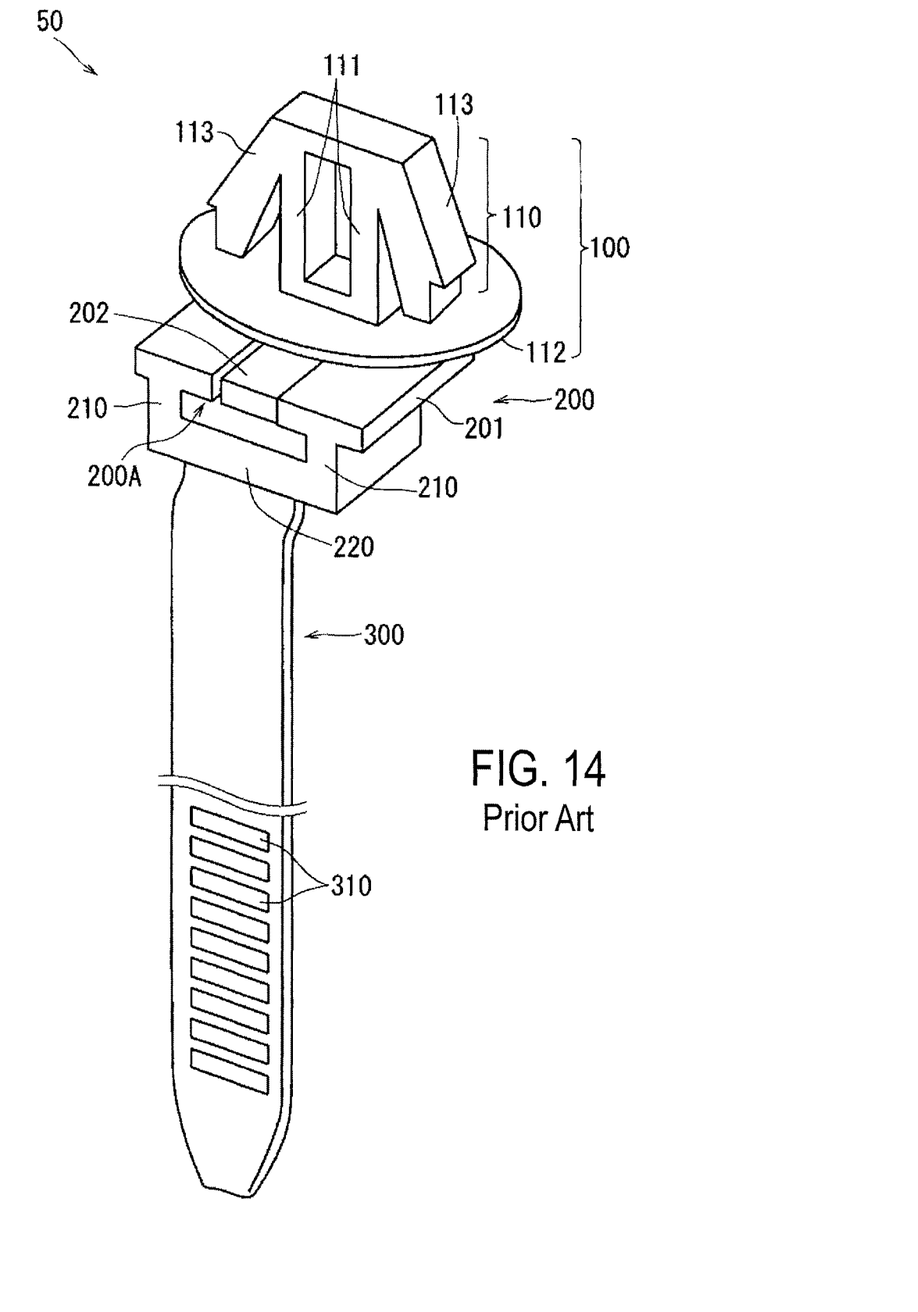
FIG. 14 is a perspective view showing details of the belt clamp.

FIG. 13 is an explanatory view schematically showing a structure in which a belt clamp, which is a vehicle mounting jig, is fixed to the corrugated tube 10. FIG. 14 is a perspective view showing details of the belt clamp 50 shown in FIG. 13. As shown in these figures, the belt clamp 50 is constituted by a fastener 100, a belt support portion 200, and a belt portion 300 that are main elements of this structure.

As shown in FIG. 13, the belt portion 300 of the belt clamp 50 is wound about the corrugated tube 10, thereby holding the corrugated tube 10. One of two ends of the belt portion 300 is a fixed end, and the other end is a free end. Furthermore, on one surface of the belt portion 300, a plurality of aligned grooves 310 are formed along a longitudinal direction of the belt portion 300.

The fastener 100 is provided with (i) a flange portion 112 to which the belt support portion 200 is fixed and (ii) an insertion portion 110 that is inserted into a mounting hole of a vehicle body or the like. The belt support portion 200 is fixed to one surface of the flange portion 112, and the insertion portion 110 is arranged on another surface. The flange portion 112 is usually formed with an area larger than the area of the mounting hole so as to seal the mounting hole on the vehicle side.

The fastener 100 is constituted by the flange 112 and the insertion portion 110. The insertion portion 110 is provided with (i) a column portion 111 that is arranged on one surface of the flange portion 112 and (ii) two projected portions 113 that are arranged and projected out at both sides of the column portion 111.

The belt support portion 200 is a portion that connects the belt portion 300 and the fastener 100. The belt support portion 200 is provided with (i) connecting portions 201 and (ii) a belt restricting portion 202 that are fixed to the fastener 100, (iii) vertical wall portions 210 that are arranged in two locations of the connecting portions 201 opposite to each other, and (iv) a belt support wall portion 220 that bridges between the vertical wall portions 210. One end (fixed end) of the belt portion 300 is fixed to the belt support wall portion 220.

The connecting portions 201 are portions that connect the flange portion 112 and the vertical wall portions 210. A displacement portion 202 is arranged between the two connecting portions 201. The two vertical wall portions 210, the displacement portion 202, and the belt support wall 220 facing the displacement portion 202 form a belt through-hole 200A into which the belt portion 300 is inserted from a free end side.

The displacement portion 202 forms part of a surrounding wall of the belt through-hole 200A. One end of the displacement portion 202 is a cantilever-beam portion that is fixed to the flange portion 112. The displacement portion 202 is flexible, whereby it can be displaced in a height direction of the belt through-hole 200A. The height direction of the belt through-hole 200A corresponds to a thickness direction of the belt portion 300 that is inserted into the belt through-hole 200A.

Additionally, as described before, in the belt support portion 200, the belt through-hole 200A is provided, into which the free end of the belt portion 300 can be inserted. This makes a receiving surface at which the bottom surface (planar portion) of the belt support wall portion 220 receives the corrugated tube 10.

Furthermore, when the corrugated tube 10 is fixed to a vehicle body, first, a fixing portion of the corrugated tube 10 is placed as a bottom surface on the receiving surface of the belt support portion 200, and the outer circumferential portion of the corrugated tube 10 is wound with the belt portion 300 and is fastened by inserting the free end of the belt portion 300 into the belt through-hole 200A of the belt support portion 200. Additionally, at this point, engagement claws formed inside of the belt support portion 200 are engaged to grooves 310 formed in the belt portion 300.

By so doing, as shown in FIG. 13, the corrugated tube 10 is held so as to be fastened and fixed to the belt clamp 50.

After the belt clamp 50 is thus fixed to the corrugated tube 10, by inserting the fastener 100 of the belt clamp 50, which fixes the corrugated tube 10, into a mounting hole formed on the vehicle body, the corrugated tube 10 can be fixed to the vehicle body.

Figure 15:
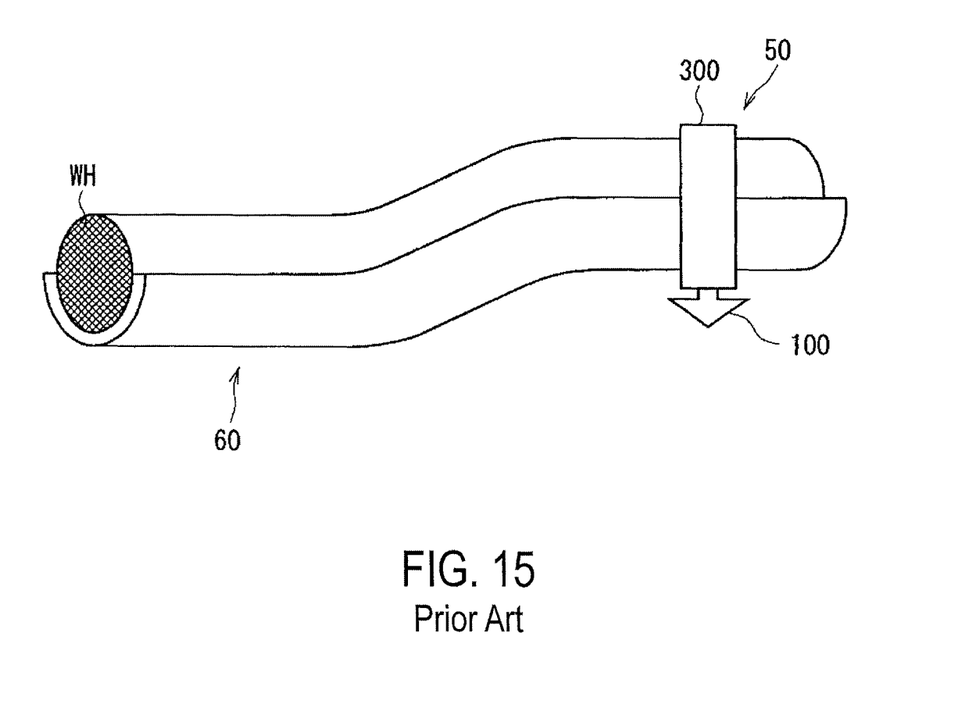
FIG. 15 is an explanatory view schematically showing a state in which a belt clamp is mounted to a half pipe.

FIG. 15 is an explanatory view schematically showing a state in which a belt clamp is mounted to a half pipe type wire harness exterior body formed by a half pipe 60.

As shown in the figure, a cross-sectional shape of the half pipe 60 is a substantially semicircular shape, and a wire harness WH is arranged along a longitudinal direction on an inner circumferential surface of the half pipe 60. Thus, the shape is such that part of the wire harness WH is exposed. Furthermore, the half pipe 60 is formed in a shape that conforms to an arrangement of the wire harness WH in a longitudinal direction. Additionally, as needed, by winding a tie band, duct tape, or the like (none of them is depicted) about the outer circumference of the wire harness WH and the half pipe 60, the wire harness WH is fixed to the half pipe 60.

Also, in a wire harness exterior body such as the half pipe 60 that is thus constituted, in the same manner as the corrugated tube 10 shown in FIGS. 12 and 13, the belt clamp 50 can be fixed to the half pipe 60 and the wire harness WH by tightening it with a belt portion 300.

Patent Reference 1: Japanese Published Utility Model Application 4-86022

Patent Reference 2: Japanese Published Patent Application 2000-184551

Patent Reference 3: Japanese Published Patent Application 2002-64917

Patent Reference 4: Japanese Published Patent Application 2006-296166

SUMMARY

Problems to be Resolved

A wire harness exterior body, such as the corrugated tube 10, the half pipe 60, or the like, is constituted as described above. By winding the belt portion of the vehicle mounting jig such as the belt clamp 50 or the like along the outer circumference, the vehicle mounting jig is fixed to the wire harness exterior body.

However, the cross-sectional shape of the wire harness exterior body is a curved shape (the corrugated tube 10 is circular, and the half pipe 60 is semicircular). Thus, there is a high possibility that the belt portion is rotated in a circumferential direction of the wire harness exterior body and is shifted in an axial direction. Position precision of mounting a vehicle mounting jig such as a belt clamp 50 to a wire harness exterior body can be poor. Additionally, once position precision of mounting a vehicle mounting jig to a wire harness exterior body becomes poor, precision of mounting a wire harness exterior body to a vehicle deteriorates.

An object is to obtain a wire harness exterior body having a structure that can stably fix a mounting jig at a desired position.

Means of Solving the Problem

According to the wire harness exterior body as set forth herein, a wire harness exterior body in which a wire harness is arranged and protected is provided with: a main body portion, which is formed extending in an axial direction and has an area at which a wire harness can be arranged inside, and in which a cross-sectional shape of an outer circumferential surface perpendicular to the axial direction is a curved shape; a rotation suppression portion that is arranged at a bottom portion of the outer circumferential surface of the main body portion and in which an entire bottom surface is provided with a planar structure; and a pair of axial direction shift suppression portions, each being formed on the outer circumferential surface of the main body portion along a circumferential direction, wherein the pair of axial direction shift suppression portions is formed with a specific distance therebetween in the axial direction, the outer circumferential surface of the main body portion at the pair of axial direction shift suppression portions is defined as a mounting area, and a formation position of the pair of axial direction shift suppression portions in the axial direction overlaps a formation position of the rotation suppression portion.

According to the wire harness exterior body as set forth herein, a wire harness exterior body in which a wire harness is arranged and protected is provided with: a main body portion, which is formed extending in an axial direction and has an area at which a wire harness can be arranged inside, and in which a cross-sectional shape of an outer circumferential surface perpendicular to the axial direction is a curved shape; and a pair of position shift suppression portions, each being arranged at a bottom portion of an outer circumferential surface of the main body portion, and each having an entire bottom surface provided with a planar structure, wherein the pair of position shift suppression portions is formed with a specific distance therebetween in the axial direction, and the outer circumferential surface of the main body portion between the pair of position shift suppression portions is defined as a mounting area.

According to the wire harness exterior body as set forth herein, a wire harness exterior body in which a wire harness is arranged and protected is provided with: a main body portion, which is formed extending in an axial direction and has an area at which a wire harness can be arranged inside, and in which a cross-sectional shape of an outer circumferential surface perpendicular to the axial direction is a curved shape; and a pair of position shift suppression portions, each protruding downward and arranged at a bottom portion of an outer circumferential surface of the main body portion, wherein the pair of position shift suppression portions is formed with a specific distance therebetween in the axial direction, and the outer circumferential surface of the main body portion between the pair of position shift suppression portions is defined as an area at which a mounting jig is arranged.

The wire harness exterior body as set forth herein is also provided wherein the specific distance, which defines a length of the mounting area in the axial direction, is such that a belt portion of a belt clamp can be wound on an outer circumferential surface of the main body portion in a circumferential direction mounting area, and includes a distance such the belt portion does not move beyond a specific allowable range in the axial direction.

The wire harness exterior body as set forth herein is also provided wherein the specific distance, which defines the axial direction length of the area in which the mounting jig is arranged, is such that a substrate of a belt winding type clamp having a substrate with a tape winding area can be arranged, and includes a distance such that the substrate does not move beyond a specific allowable range in the axial direction.

Effects

By winding the belt portion of the belt type mounting jig about the mounting area, a mounting jig can be mounted to the wire harness exterior body of the invention of this application.

By making the receiving surface of the belt support portion of the belt type mounting jig contact the bottom surfaces of the rotation suppression portions, position shifting of the wire harness exterior body in the mounting jig in a circumferential direction can be reliably avoided. Additionally, even when the belt portion is wound including the rotation suppression portion as well, because an entire bottom surface is provided with the planar structure, position shifting in the mounting jig in the circumferential direction can be effectively restricted.

Additionally, by setting the specific distance so as to match the width of the belt portion, movement of the belt portion in the axial direction can be restricted by the pair of axial direction shift suppression portions. Thus, shifting of the belt portion in the mounting jig in the axial direction can be reliably avoided.

As a result, in the wire harness exterior body, a belt type mounting jig such as a belt clamp can be precisely fixed at a desired position.

By winding a belt portion of a belt type mounting jig about the mounting area, a mounting jig can be fixed to the wire harness exterior body.

By making the receiving surface of the belt support portion of the belt type mounting jig contact the bottom surface of the pair of position shift suppression portions, position shifting of the wire harness exterior body in the mounting jig in a circumferential direction can be reliably avoided.

Additionally, by setting the specific distance so as to match the width of the belt portion, the pair of position shift suppression portions restricts the movement of the belt portion in the axial direction. Thus, shifting of the belt portion in the mounting jig in the axial direction can be reliably avoided.

As a result, in the wire harness exterior body, a belt type mounting jig such as a belt clamp can be precisely fixed at a desired position.

By arranging a substrate of a tape type mounting jig at the area at which the mounting jig is arranged and tape-winding the wire harness exterior body including the substrate, the mounting jig can be mounted to the wire harness exterior body.

At this point, the substrate of the tape winding type mounting jig is inserted into the pair of position shift suppression portions; thus, by setting the specific distance so as to match the length of the substrate of the mounting jig in the axial direction when it is arranged within the area in which the mounting jig is arranged, the pair of position shift suppression portions restricts the movement of the substrate in an axial direction. Thus, shifting in the mounting jig in the axial direction can be reliably avoided.

As a result, in the wire harness exterior body, a tape type mounting jig can be precisely fixed at a desired position.

Objects, features, aspects, and advantages of this invention become more apparent with reference to the following detailed explanation and the attached drawings.

DETAILED DESCRIPTION OF THE EMBODIMENTS

Embodiment 1

Figure 1:
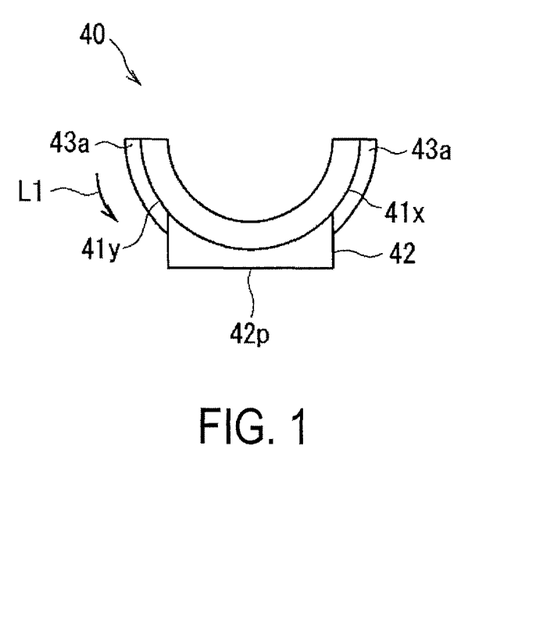
FIG. 1 is an explanatory view schematically showing a cross-sectional structure of a half pipe that is embodiment 1.
Figure 2:
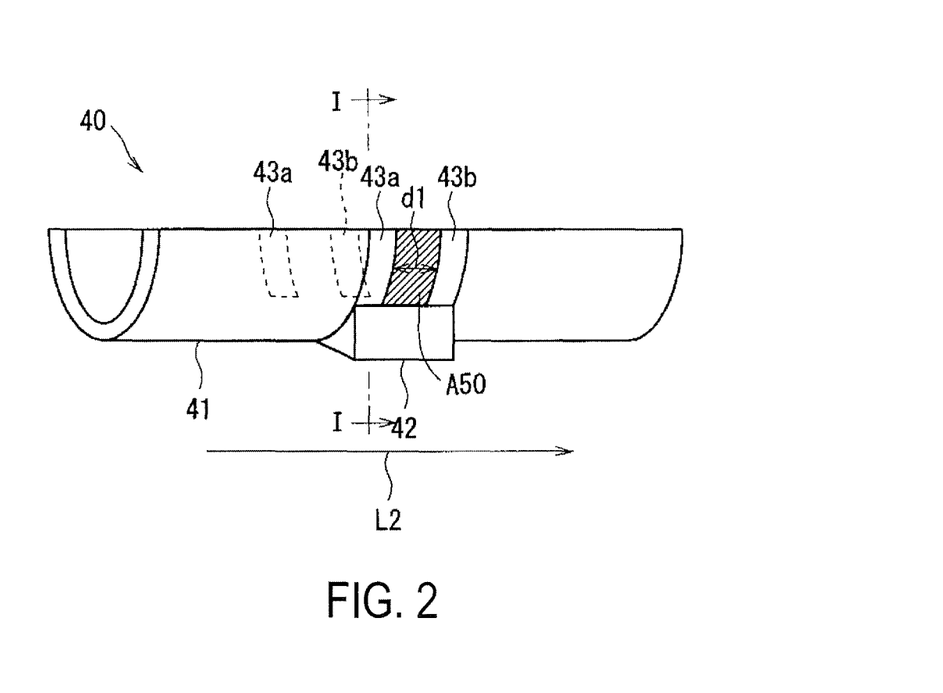
FIG. 2 is a cross-sectional view schematically showing a side structure of the half pipe that is embodiment 1.

FIGS. 1 and 2 are explanatory views schematically showing a half pipe of embodiment 1. FIG. 1 shows a cross-sectional structure of a cross section of the half pipe perpendicular to an axial direction. FIG. 2 shows a side structure in a direction along an axial direction. Furthermore, FIG. 1 is a schematic cross-sectional view along line I-I of FIG. 2.

Furthermore, in this specification, the axial direction means a longitudinal direction in which a wire harness exterior body such as a half pipe is formed, for example, a direction along a direction shown by axis L2 of FIG. 2. A circumferential direction means a direction along an outer circumference of a wire harness exterior body perpendicular to the axial direction, for example, a direction along a direction shown by axis L1 of FIGS. 1 and 13.

As shown in these figures, a half pipe 40 of embodiment 1 is constituted by a half pipe main body 41 (main body portion), a rotation suppression portion 42, and a pair of ribs 43a and 43b (axial-direction shift suppression portions).

The half pipe main body 41 is formed extending in an axial direction (axis L2 direction) and is provided with an area in which a wire harness can be arranged inside of the half pipe main body 41, and a cross-sectional shape of an outer circumferential surface perpendicular to the axial direction is semicircular (curved).

The rotation suppression portion 42 is arranged at a bottom portion of an outer circumferential surface of the half pipe main body 41 and is provided with a bottom surface 42p of a planar structure. Because the rotation suppression portion 42 exists, the outer circumferential surface of the half pipe main body 41 in the vicinity of the rotation suppression portion 42 is separated into two side surfaces, which are side surfaces 41x and 41y.

The pair of ribs 43a and 43b is formed along a circumferential direction on an outer circumferential surface of the half pipe main body 41. Furthermore, the ribs 43a and 43b are formed with a distance d1 (specific distance) therebetween in an axial direction, on the respective side surfaces 41x and 41y. That is, the ribs 43a and 43b are formed to the rotation suppression portion 42 from upper tip end portions of the respective side surfaces 41x and 41y. Thus, a formation position of the ribs 43a and 43b in the axial direction (direction of the axis L2) overlaps a formation position of the rotation suppression portion 42. Additionally, it is also acceptable if the ribs 43a and 43b are formed only on one of the side surfaces 41x and 41y.

Additionally, (i) an area A50 of the side surfaces 41x and 41y between the ribs 43a and 43b and (ii) the side surface portion of the rotation suppression portion 42 and the bottom surface 42p are defined as a clamp mounting area (mounting area). In this clamp mounting area, mounting can be performed by a belt winding type belt clamp.

Figure 3:
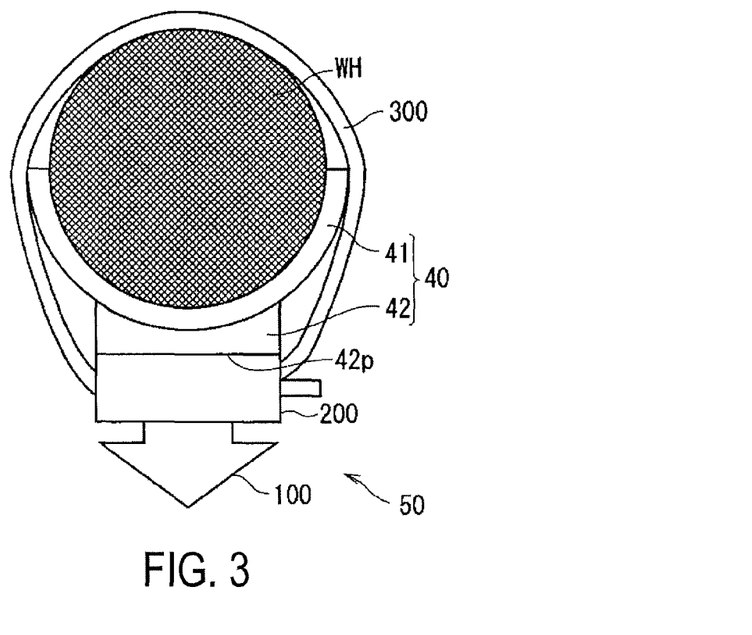
FIG. 3 is an explanatory view schematically showing a state in which a belt clamp is mounted to the half pipe of embodiment 1 (cross-sectional structure).
Figure 4:
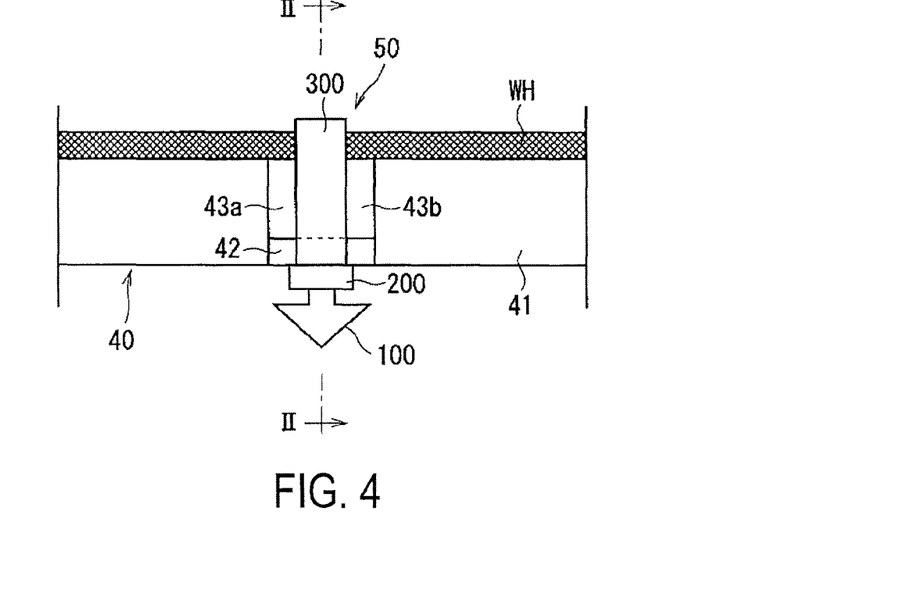
FIG. 4 is an explanatory view schematically showing a state in which a belt clamp is mounted to the half pipe of embodiment 1 (side structure).

FIGS. 3 and 4 are explanatory views schematically showing a state in which a belt clamp is mounted to the half pipe 40 of embodiment 1. FIG. 3 shows a cross-sectional structure of a cross section of the half pipe 40 perpendicular to an axial direction. FIG. 4 shows a side structure of a direction along the axial direction. FIG. 3 is a schematic cross-sectional view along line II-II of FIG. 4.

Furthermore, the belt clamp 50 is the same as the belt clamp 5 shown in FIGS. 13 and 14. Thus, the same symbols are used, and the depicted contents are also simplified and shown.

As shown in FIGS. 3 and 4, by placing the bottom surface 42p of the rotation suppression portion 42 on the receiving surface of the belt support portion 200 (planar area) and winding an exposed portion of the upper portion of the wire harness WH and the outer circumferential portion area (corresponding to the area A50 of FIG. 2) of the half pipe main body 41 between the ribs 43a and 43b with the belt portion 300, the belt clamp 50 can be mounted to the half pipe 40.

At this time, by making the receiving surface of the belt support portion 200 contact the bottom surface 42p of the rotation suppression portion 42, position shifting of the half pipe 40 of the belt clamp 50 in a circumferential direction can be reliably avoided. Furthermore, when the belt portion 300 is wound to include the rotation suppression portion 42, position shifting of the half pipe 40 of the belt clamp 50 in a circumferential direction can be effectively regulated because the bottom surface 42p is not curved, but flat.

Additionally, by setting the distance d1 between the ribs 43a and 43b to match a width of the belt portion 300 (length in the axis L2 direction), movement of the belt portion 300 in an axial direction can be restricted by the ribs 43a and 43b that are formed projecting from the outer circumferential surface of the half pipe main body 41. Thus, a phenomenon of the belt portion 300 of the belt clamp 50 that is wound about the half pipe 40 shifting in an axial direction can be reliably avoided.

Additionally, the distance d1 that matches a width of the belt portion 300 means the same width as the belt portion 300 or a slightly longer distance than the width of the belt portion 300. That is, the belt portion 300 can be wound along a circumferential direction on an outer circumferential surface of the half pipe main body 41 between the ribs 43a and 43b and does not move in an axial direction outside of a specific allowable range. Furthermore, the specific allowable range can be set at an arbitrary value of zero or more.

Thus, the half pipe 40 of embodiment 1 can precisely fix a belt type vehicle mounting jig such as the belt clamp 50 at a desired position. Therefore, precision of mounting the half pipe 40, which is a wire harness exterior body, to a vehicle does not deteriorate.

Embodiment 2

Figure 5:
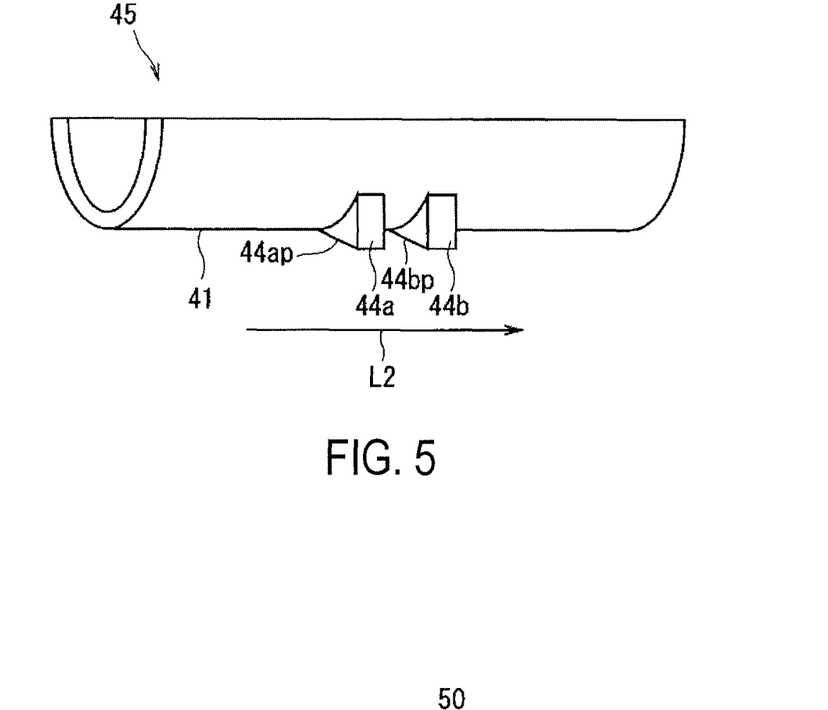
FIG. 5 is a cross-sectional view schematically showing a side structure of a half pipe of embodiment 2.

FIG. 5 is a cross-sectional view schematically showing a half pipe that is embodiment 2. FIG. 5 shows a side structure in a direction along an axial direction.

As shown in FIG. 5, the half pipe 45 of embodiment 2 is constituted by the half pipe main body 41 and a pair of shift suppression portions 44a and 44b.

The half pipe main body 41 is formed extending in an axial direction (axis L2 direction) and is provided with an area in which a wire harness can be arranged inside the half pipe main body 41, and a cross-sectional shape of an outer circumferential surface perpendicular to the axial direction is semicircular (curved shape).

A pair of shift prevention portions 44a and 44b is arranged at the bottom portion of the outer circumferential surface of the half pipe main body 41 and is provided with bottom surfaces 44ap and 44bp, respectively, with a planar structure. Additionally, the shift prevention portions 44a and 44b are formed along a circumferential direction on the outer circumferential surface of the half pipe main body 41, with a distance d2 (specific distance) therebetween, in an axial direction.

Furthermore, the outer circumferential surface of the half pipe main body 41 between the shift suppression portions 44a and 44b, and part of the bottom surfaces 44ap and 44bp of the shift suppression portions 44a and 44b, respectively, are defined as a clamp mounting area, and mounting can be performed in the clamp mounting area by winding the belt clamp 50.

Figure 6:
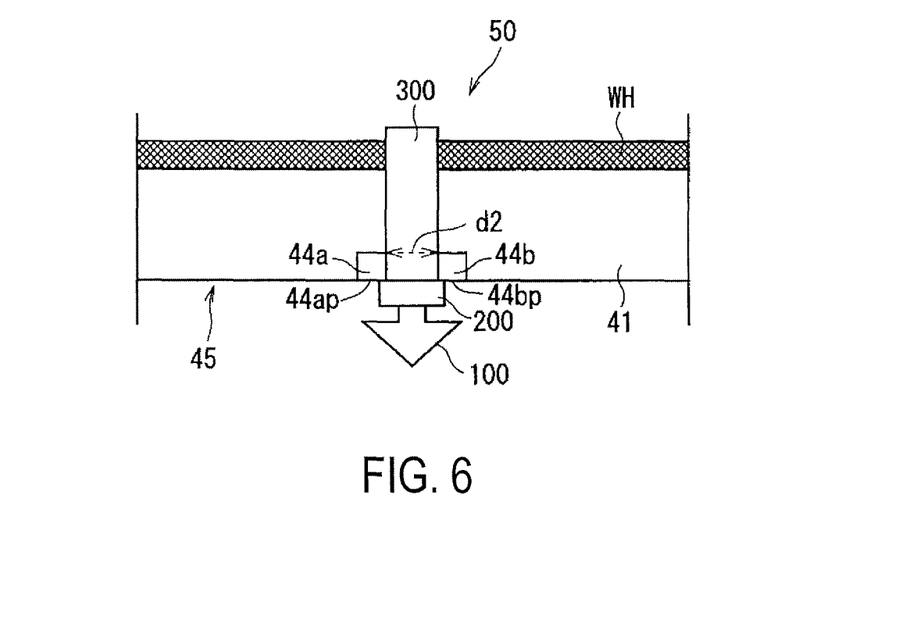
FIG. 6 is an explanatory view schematically showing a state in which a belt clamp is mounted to the half pipe of embodiment 2.

FIG. 6 is an explanatory view schematically showing a state in which the belt clamp is mounted to the half pipe 45 of embodiment 2. FIG. 6 shows a side structure of a direction along an axial direction.

Furthermore, the belt clamp 50 is the same as the belt clamp 5 shown in FIGS. 13 and 14. Thus, the same symbols are used, and the depicted contents are also simplified and shown.

As shown in FIG. 6, by placing part of the bottom surfaces 44ap and 44bp of the shift suppression portions 44a and 44b, respectively, on the receiving surface of the belt support portion 200 and winding the outer circumferential area of the half pipe main body 41 between the shift suppression portions 44a and 44b and the exposed portion of the upper portion of the wire harness WH with the belt portion 300, the belt clamp 50 can be mounted to the half pipe 45.

At this time, by making the receiving surface of the belt support portion 200 contact the bottom surfaces 44ap and 44bp of the shift suppression portions 44a and 44b, shifting of the half pipe 45 of the belt clamp 50 in a circumferential direction can be reliably avoided.

Additionally, by setting a distance d2 between the shift suppression portions 44a and 44b so as to match the width of the belt portion 300, in the same manner as the effect due to the ribs 43a and 43b of embodiment 1, shifting of the belt portion 300 that is wound about the half pipe 45 in an axial direction can be reliably avoided.

Thus, in the same manner as the half pipe 40 of embodiment 1, the half pipe 45 of embodiment 2 can precisely fix a belt type vehicle mounting jig such as the belt clamp 50 at a desired position. Therefore, precision of mounting the half pipe 45, which is a wire harness exterior body, to a vehicle does not deteriorate.

Embodiment 3

Figure 7:
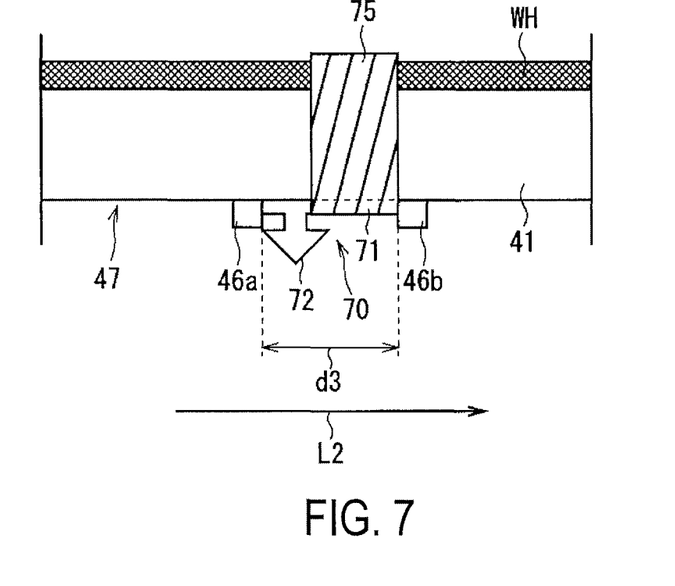
FIG. 7 is an explanatory view schematically showing a state in which a substrate type clamp is mounted to the half pipe of embodiment 2.

FIG. 7 is an explanatory view schematically showing a state in which a tape winding type clamp is mounted to a half pipe 47 of embodiment 3. FIG. 7 shows a side structure in a direction along an axial direction.

As shown in the same figure, in a substrate type clamp 70, a fastener 72 (equal to the fastener 100 of the belt clamp 50) is arranged protruding from a substrate 71 that has a tape winding area.

Additionally, a pair of shift suppression protrusions 46a and 46b (position shift suppression portions) is formed protruding downward at the bottom portion of the outer circumference of the half pipe main body 41. The pair of shift suppression protrusions 46a and 46b is formed with a distance d3 (specific distance) therebetween in a direction of the axis L2. The outer circumferential surface of the half pipe main body 41 is defined as a clamp arranging area (area in which a mounting jig is arranged) between the pair of shift suppression protrusions 46a and 46b.

With respect to the half pipe 47 of embodiment 3 of such a structure, the clamp arranging area between the shift suppression protrusions 46*a* and 46*b* is placed on the receiving surface (a surface opposite to a surface on which the fastener 72 is formed) of the substrate 71. At this point, the substrate 71 is between the pair of shift suppression protrusions 46*a* and 46*b*.

Furthermore, by winding the outer circumferential portion of the half pipe main body 41, the exposed portion of the wire harness WH, and the substrate 71 with a tape 75 multiple times, the substrate type clamp 70 can be mounted to the half pipe 45.

At this time, shifting of the half pipe 45 in the substrate type clamp 70 in the circumferential direction can be reliably avoided by winding with the tape 75 to include the substrate 71 of the substrate type clamp 70.

Additionally, by setting the distance d3 between the shift suppression portions 44*a* and 44*b* to match the width of the substrate 71 (length of the half pipe 45 on the axial direction side), shifting of the half pipe 47 in the substrate type clamp 70 in an axial direction can be reliably avoided.

Additionally, the distance d3 that matches the width of the substrate 71 means the same width as the substrate 71 or a slightly longer distance than the width of the substrate 71. That is, the substrate 71 can be placed on the outer circumferential surface (clamp arranging area) of the half pipe main body 41 between the pair of the shift suppression protrusions 46*a* and 46*b* and this means a distance in which the substrate 71 does not move beyond a specific allowable range in an axial direction. Furthermore, the specific allowable range can be set at an arbitrary value of zero or more.

Thus, the half pipe 47 of embodiment 3 can be precisely fixed in a vehicle mounting jig such as a substrate type clamp at a desired position as well.

Application to Corrugated Tube

In embodiments 1-3, a half pipe is shown as a wire harness exterior body, but the embodiments are not limited to this and the invention can also apply to other wire harness exterior bodies.

For example, with respect to the corrugated tube 10 shown in FIGS. 12 and 13, by using a specific portion of the outer circumferential surface of the corrugated tube 10 as a bottom surface, and making a structure that arranges parts corresponding to the rotation suppression portion 42 and the ribs 43*a* and 43*b* of embodiment 1, a corrugated tube corresponding to that of embodiment 1 can be obtained.

In the same manner, by using a specific portion of the outer circumferential surface of the corrugated tube 10 as a bottom surface, and making a structure that arranges parts corresponding to the shift suppression portions 44*a* and 44*b* of embodiment 2, a corrugated tube corresponding to that of embodiment 2 can be obtained.

Additionally, by using a specific portion of the outer circumferential surface of the corrugated tube 10 as a bottom surface, and making a structure that arranges parts corresponding to the shift suppression portions 46*a* and 46*b* of embodiment 3, a corrugated tube corresponding to that of embodiment 2 can be obtained.

Additionally, this can also apply to a corrugated tube with a passage maintaining member in which the corrugated tube is provided with a passage maintaining function.

Figure 8:
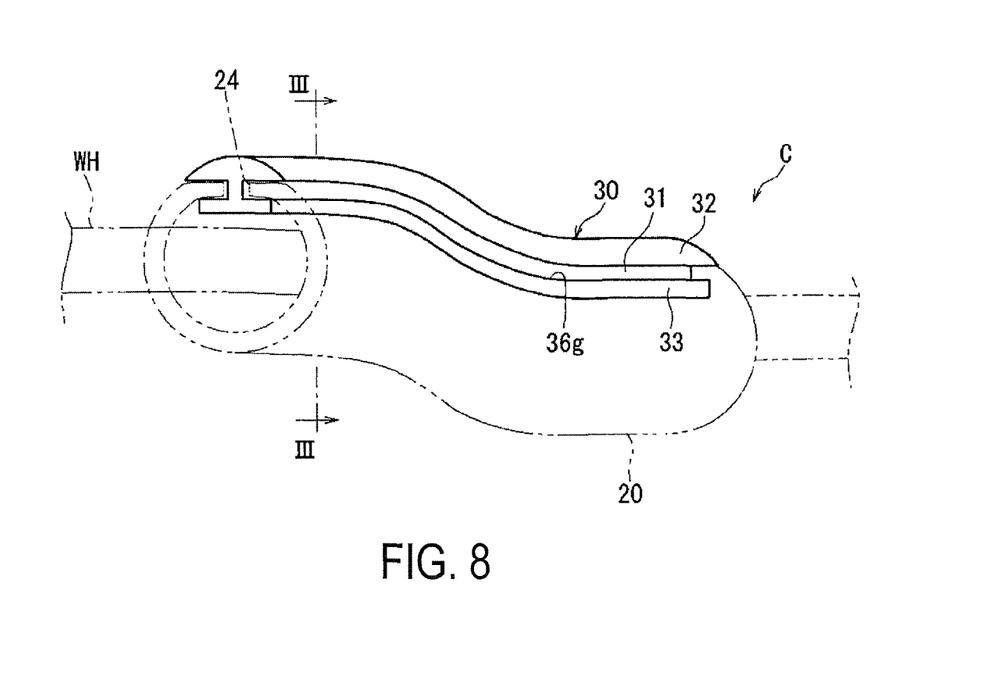
FIG. 8 is a schematic perspective view showing a mounting portion of a corrugated tube.
Figure 9:
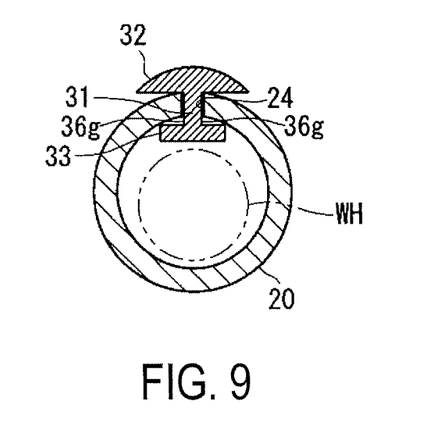
FIG. 9 is a schematic cross-sectional view along line III-III of FIG. 8.
Figure 10:
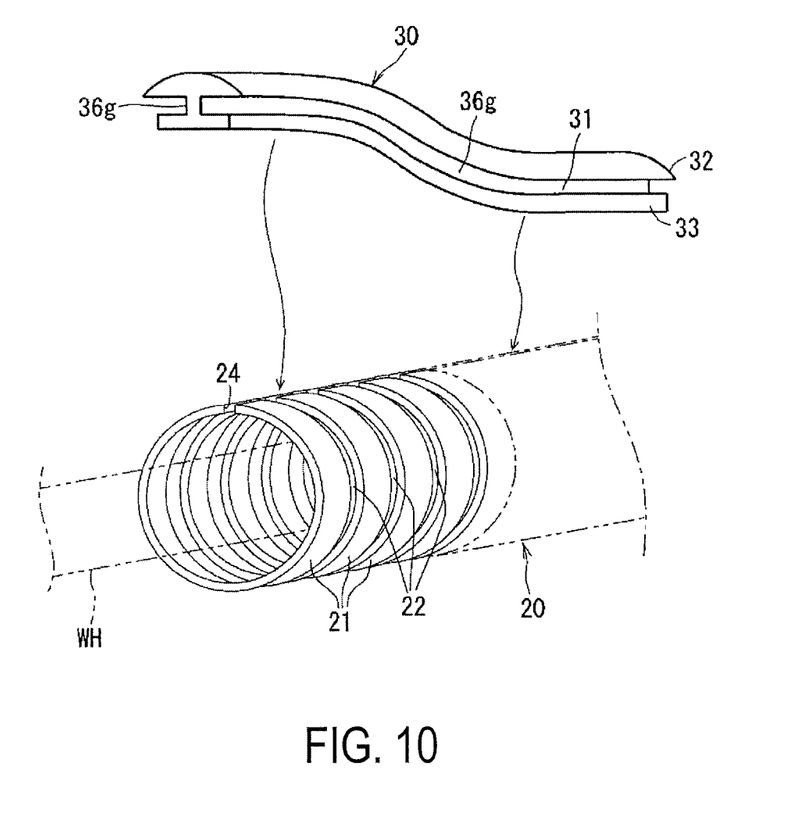
FIG. 10 is an explanatory view showing a step of mounting a passage maintaining member to the corrugated tube.

The following explains a corrugated tube with a passage maintaining member that is constituted as a wire harness exterior body. FIG. 8 is a schematic perspective view showing a portion on which a corrugated tube 20 is mounted. FIG. 9 is a schematic cross-sectional view along line III-III of FIG. 8. FIG. 10 is an explanatory view showing a step of mounting a passage maintaining member 30 to a corrugated tube 20.

When a wire harness WH is arranged on a vehicle or the like, it is made to be curved along the arrangement shape. In order to control the wire harness WH from interfering with a surrounding portion or the like, the wire harness WH is maintained in a shape curved along the wiring shape. In such a case, a corrugated tube C with this passage maintaining member (corrugated tube 20 plus passage maintaining member 30) is mounted to the wire harness WH, and the wire harness WH is maintained in a specific curved shape. Furthermore, the portion in which the corrugated tube C with this passage maintaining member is mounted to the wire harness WH may be at least part of the wire harness WH, that is, may be part of the wire harness WH or may be the entire wire harness WH.

The corrugated tube 20 is a cylindrical member in which annular convex portions 21 and annular concave portions 22 are alternately formed along a longitudinal direction (see FIG. 10) and is formed of resin or the like. The corrugated tube 20 is easily elastically deformed at step portions or the like between the annular convex portions 21 and the annular concave portions 22. Thus, the entire corrugated tube 20 has an easily deformable property. Normally, for a corrugated tube 20, a tube is used that has an inner diameter larger than (usually slightly larger than) an outer diameter of the portion of the wire harness WH to be mounted.

Furthermore, on one side portion of the corrugated tube 20, a slit 24 is formed along the longitudinal direction. Additionally, by splitting and opening the corrugated tube 20 with the slit 24, the wire harness WH can be easily arranged within the corrugated tube 20.

The passage maintaining member 30 is a long member that is die-molded so as to maintain a shape at least part of which is curved along a longitudinal direction and is formed of resin such as P.P. (polypropylene). In other words, the passage maintaining member 30 is formed in a shape at least part of which is curved at the time of die-molding. The curved shape of the passage maintaining member 30 is set in a shape corresponding to an arranging passage in which a portion of the wire harness WH to be mounted is arranged. In the example shown in FIG. 8, an intermediate portion of the passage maintaining member 30 in the longitudinal direction is curved so as to form a moderate S shape, and both end portions of the passage maintaining member 30 are formed in a linear shape. Either the entire portion or part of the passage maintaining member 30 may be formed in a curved shape. Furthermore, the portion formed in a curved shape may be formed in a shape that is curved in a plane, or may be formed in a dimensionally (three-dimensionally) curved shape.

The passage maintaining member 30 is mounted to the corrugated tube 20 along the longitudinal direction. That is, the passage maintaining member 30 has a portion in which a pair of concave groove portions 36*g* is formed so as to be able to house end peripheral portions of both sides of the slit 24 of the corrugated tube 20. In other words, the passage maintaining member 30 is constituted such that an outer circumferential side protrusion 32 is arranged at one side (outer circumferential side) peripheral portion of an elongate connector 31, and an inner circumferential side protrusion 33 is arranged at the other side (inner circumferential side) peripheral portion of the connector 31, and a cross-sectional shape on a plane perpendicular to the longitudinal direction is a substantially H shape. The outside surface of the outer circumferential side protrusion 32 is provided with a curved surface in an arc shape along an outer circumferential surface of the corrugated tube 20. The width dimension of the concave groove portions 36*g* is set at a dimension substantially the same as a thickness dimension of the corrugated tube 20 (more specifically, the difference between the outermost circumferential portion of the annular convex portions 21 and the innermost circumferential portion of the annular concave portions 22 in a diameter direction of the corrugated tube 20), or larger than (or slightly larger than) this. The depth dimension of the concave groove portions 36g is not particularly limited. It is acceptable to have the depth dimension of the concave groove portions 36g to a degree in which the end peripheral portions of the corrugated tube 20 can be housed so as to be positioned in the diameter direction. There is no particular limitation to this.

The portion of the passage maintaining member 30 on which the pair of concave groove portions 36g is formed may be the entire longitudinal direction of the passage maintaining member 30 or may be a portion along the longitudinal direction. In the examples shown in FIGS. 8-10, an example is used for an explanation in which the pair of concave groove portions 36g is formed over the entire longitudinal direction of the passage maintaining member 30.

The passage maintaining member 30 is mounted to the corrugated tube 20 along the longitudinal direction. Here, as shown below, the passage maintaining member 30 is mounted to the corrugated tube 20 so as to be arranged in the slit 24.

That is, by opening the corrugated tube 20 with the slit 24, the wire harness WH is housed within the corrugated tube 20. In this state, by opening the corrugated tube 20 with the slit 24, end peripheral portions of the both sides of the slit 24 of the corrugated tube 20 fit into the pair of concave groove portions 36g. In this state, the connector 31 is arranged within the slit 24, the outer circumferential side protrusion 32 is arranged along the outer circumferential surface of the corrugated tube 20 outside of the slit 24, and the inner circumferential side protrusion 33 is arranged along the inner circumferential surface of the corrugated tube 20 inside of the slit 24. By so doing, while the corrugated tube 20 is curved along a shape of the passage maintaining member 30, it is integrated to the passage maintaining member 30.

Then, as needed, a tie band, an adhesive tape, or the like is wound about the outer circumference of the corrugated tube 20, and a closed state of the corrugated tube 20 is maintained. At the same time, integration of the corrugated tube 20 and the passage maintaining member 30 is maintained. Additionally, other than this, closing of the corrugated tube 20 may be maintained by a lock mechanism or the like arranged in the corrugated tube 20.

According to the wire harness exterior body having the corrugated tube C with a passage maintaining member that is thus constituted, the wire harness WH is covered and protected by the corrugated tube 20, and the wire harness exterior body is maintained so as to define a passage that is curved in a specific shape by the passage maintaining member 30. Because of this, by forming the passage maintaining member 30 in a shape conforming to a location in which the wire harness WH is arranged, the wire harness WH can be maintained in a specific passage conforming to the arranged location. Unlike a member that is a so-called protector, the passage maintaining member 30 does not play a role in covering the wire harness WH. So it can be formed in a small and simple shape. Because of this, when the passage maintaining member 30 is manufactured (which is die-molded) so as to maintain a shape at least part of which is curved along a longitudinal direction, the passage maintaining member 30 can be formed at a relatively low cost by controlling complexity of a die-molded structure and having a relatively simplified die-molded structure. Thus, the passage can be constantly maintained while covering the wire harness WH at a lower cost. In particular, when the wire harness WH is arranged so as to be three-dimensionally curved, the passage restricting member has a complex shape, so the die-molded structure is effective for such a case.

Additionally, a state of a bent wire harness WH can be maintained; thus, when the wire harness WH is assembled to a vehicle or the like, the number of locations of mounting to the vehicle can be reduced. In other words, at least the location to which the corrugated tube C with a passage maintaining member is mounted can maintain the wire harness WH in a constant curved shape. Because of this, the number of clamp members or the like that mount and fix the wire harness WH, the number of mounting operations, and the like can be reduced. From this standpoint as well, a manufacturing cost of the corrugated tube C with a passage maintaining member and a mounting operation cost can be reduced.

Additionally, while the passage maintaining member 30 is arranged in the slit 24, it is mounted to the corrugated tube 20. Thus, the mounting position relationship of the corrugated tube 20 and the passage maintaining member 30 is stabilized. Because of this, the corrugated tube 20 can be easily maintained at a specific shape along the shape of the passage maintaining member 30.

Furthermore, the end peripheral portions of the both sides of the slit 24 of the corrugated tube 20 are housed in the pair of concave groove portions 36g. Thus, the passage maintaining member 30 is controlled so as to not be removed from the corrugated tube 20.

Additionally, the slit 24 is sealed by the passage maintaining member 30, so a situation is suppressed in which the wire harness WH of the corrugated tube 20 is removed to the outside of the slit 24.

Figure 11:
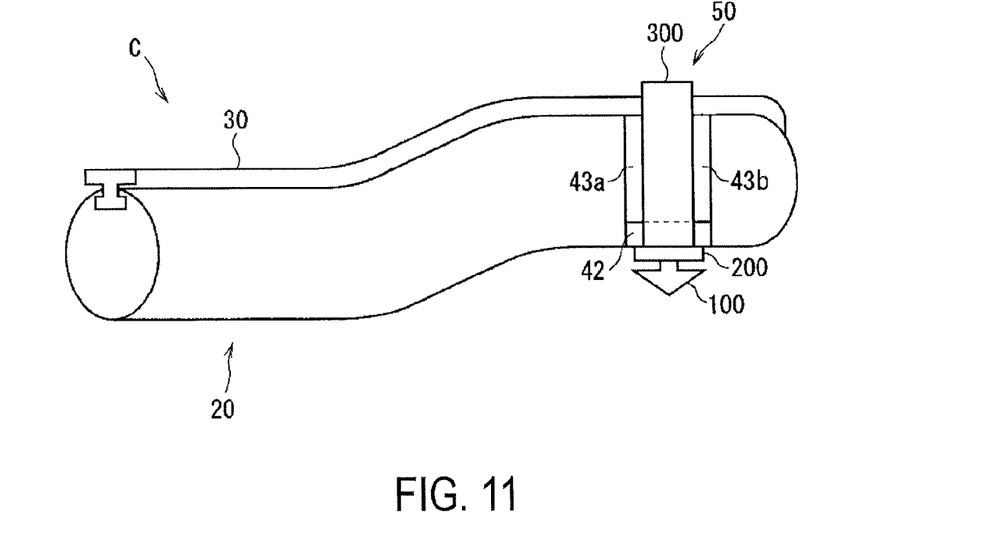
FIG. 11 is an explanatory view schematically showing a state in which a belt clamp is mounted to a corrugated tube with a passage maintaining member to which the structure of embodiment 1 is applied.

FIG. 11 is an explanatory view schematically showing a belt clamp mounting state when the structure of embodiment 1 is applied to the wire harness exterior body that is the above-described corrugated tube C with a passage maintaining member.

As shown in the same figure, by placing a planar portion of the rotation suppression portion 42 on the receiving surface of the belt support portion 200 and winding the area between the ribs 43a and 43b and the passage maintaining member 30 that are outer circumferential portions of the corrugated tube 20 with the belt portion 300, the belt clamp 50 can be fixed to the corrugated tube C with a passage maintaining member.

At this time, shifting of the corrugated tube 20 of the belt clamp 50 in a circumferential direction can be reliably avoided because the receiving surface of the belt support portion 200 and the planar portion of the rotation suppression portion 42 match each other.

Furthermore, by setting a distance d1 between the ribs 43a and 43b so as to match the width of the belt portion 300, shifting of the belt portion 300, which is wound about the corrugated tube 20, in an axial direction can be reliably avoided.

Thus, by applying the structure of embodiment 1 to the corrugated tube C with a passage maintaining member, the corrugated tube C with a passage maintaining member can precisely fix a belt type vehicle mounting jig such as the belt clamp 50 at a desired position.

In the same manner, by applying the structure of embodiments 2 and 3 to the corrugated tube C with a passage maintaining member, the corrugated tube C with a passage maintaining member can precisely fix a vehicle mounting jig such as the belt clamp 50 or the substrate type clamp 70 at a desired position.

Thus, the structure of the invention of this application shown in embodiments 1-3 can apply to various wire harness exterior bodies such as a corrugated tube, a corrugated tube with a passage maintaining member, a half pipe, or the like.

The corrugated tube C with a passage maintaining member and the half pipe are fixed to the wire harness exterior body when the wire harness WH is mounted. There is no degree-of-freedom in the wire harness WH, so position accuracy of the vehicle mounting jig with respect to the wire harness exterior body becomes important. Thus, in particular, an effect is significant in the corrugated tube with a passage maintaining member and the half pipe.

Furthermore, if portions corresponding to the ribs 43a and 43b of embodiment 1 and the shift suppression ribs 46a and 46b of embodiment 3 are arranged in the corrugated tube 10 and the corrugated tube C with a passage maintaining member, it is desirable to arrange them at portions corresponding to the annular convex portions (21, 22).

This invention was explained in detail, but the above explanation is an example in all aspects, and this invention is not limited to any of this. Countless modified examples that are not shown are not out of the scope of this invention and are construed to be within the scope of this invention.

The invention claimed is:

1. A wire harness exterior body in which a wire harness is arranged and protected in the wire harness exterior body, the wire harness exterior body comprising:
   a main body portion extending in an axial direction and having an area corresponding to dimensions of the wire harness;
   an outer circumferential surface of the main body portion is curved in a cross-section perpendicular to the axial direction;
   a rotation suppression portion arranged at a bottom portion of the outer circumferential surface of the main body portion, the rotation suppression portion having an entire bottom surface provided with a planar structure; and
   a pair of axial direction shift suppression portions, each axial direction shift suppression portion being formed on the outer circumferential surface of the main body portion along a circumferential direction, wherein
      the pair of axial direction shift suppression portions are formed with a specific distance therebetween in the axial direction, the outer circumferential surface of the main body portion at the pair of axial direction shift suppression portions is a mounting area, and
      a formation position of the pair of axial direction shift suppression portions in the axial direction overlaps a formation position of the rotation suppression portion.

2. The wire harness exterior body as set forth in claim 1, wherein
   the specific distance, which defines a length of the mounting area in the axial direction, is such that a belt portion of a belt clamp can be wound on the outer circumferential surface of the main body portion in a circumferential direction mounting area, and includes a distance such that the belt portion does not move beyond a specific allowable range in the axial direction.

3. A wire harness exterior body in which a wire harness is arranged and protected in the wire harness exterior body, the wire harness exterior body comprising:
   a main body portion extending in an axial direction and having an area corresponding to dimensions of the wire harness;
   an outer circumferential surface of the main body portion is curved in a cross-section perpendicular to the axial direction; and
   a pair of position shift suppression portions, each axial direction shift suppression portion being arranged at a bottom portion of an outer circumferential surface of the main body portion, and each position shift suppression portion having an entire bottom surface provided with a planar structure, wherein
      the pair of position shift suppression portions is formed with a specific distance therebetween in the axial direction,
      the outer circumferential surface of the main body portion between the pair of position shift suppression portions is a mounting area, and
      a pair of bottom surfaces of the pair of shift suppression portions are placed on a receiving surface of a belt support portion, and a belt portion is wound around the outer circumferential area of the main body portion between the pair of shift suppression portions.

4. The wire harness exterior body as set forth in claim 3, wherein
   the specific distance, which defines a length of the mounting area in the axial direction, is such that the belt portion of a belt clamp can be wound on the outer circumferential surface of the main body portion in a circumferential direction mounting area, and includes a distance such that the belt portion does not move beyond a specific allowable range in the axial direction.

5. A wire harness exterior body in which a wire harness is arranged and protected in the wire harness exterior body, the wire harness exterior body comprising:
   a main body portion extending in an axial direction and having an area corresponding to dimensions of the wire harness;
   an outer circumferential surface of the main body portion is curved in a cross-section perpendicular to the axial direction is a curved shape; and
   a pair of position shift suppression portions, each protruding downward and arranged at a bottom portion of an outer circumferential surface of the main body portion, wherein
      the pair of position shift suppression portions are formed with a specific distance therebetween in the axial direction, and the outer circumferential surface of the main body portion between the pair of position shift suppression portions is an area at which a mounting jig is arranged, and
      a pair of bottom surfaces of the pair of shift suppression portions are placed on a receiving surface of a belt support portion, and a belt portion is wound around the outer circumferential area of the main body portion between the pair of shift suppression portions.

6. The wire harness exterior body as set forth in claim 5, wherein
   the specific distance, which defines the axial direction length of the area in which the mounting jig is arranged, is such that a substrate of a belt winding type clamp having a substrate with a tape winding area can be arranged, and includes a distance such that the substrate does not move beyond a specific allowable range in the axial direction.

7. A wire harness exterior body in which a wire harness is arranged and protected in the wire harness exterior body, the wire harness exterior body comprising:
   a main body portion extending in an axial direction and having an area corresponding to dimensions of a wire harness;
   a cross-sectional shape of an outer circumferential surface of the main body portion perpendicular to the axial direction is a curved shape;

a rotation suppression portion arranged at a bottom portion of the outer circumferential surface of the main body portion;

an entire bottom surface provided in the rotation suppression portion with a planar structure; and a pair of axial direction shift suppression portions, each axial direction shift suppression portion being formed on the outer circumferential surface of the main body portion along a circumferential direction, wherein the pair of axial direction shift suppression portions are formed with a specific distance therebetween in the axial direction, a mounting area is defined at the outer circumferential surface of the main body portion at the pair of axial direction shift suppression portions, and a formation position of the pair of axial direction shift suppression portions in the axial direction overlaps a formation position of the rotation suppression portion.

8. The wire harness exterior body as set forth in claim 7, wherein the specific distance, which defines a length of the mounting area in the axial direction, is such that a belt portion of a belt clamp can be wound on the outer circumferential surface of the main body portion in a circumferential direction mounting area, and includes a distance such that the belt portion does not move beyond a specific allowable range in the axial direction.

* * * * *